United States Patent [19]
DiNunzio et al.

[11] Patent Number: 6,007,338
[45] Date of Patent: Dec. 28, 1999

[54] ROLLER COASTER SIMULATOR

[75] Inventors: Joseph P. DiNunzio, Sierra Madre; Thomas K. Morris, Topanga, both of Calif.; Steven A. Elliott, Madison, Wis.; Joseph O. Garlington, LaCrescenta, Calif.; Raul S. Fernandez, Beverly Hills, Calif.; Susan M. Bryan, Los Angeles, Calif.; Kevin R. Rice, Pasadena, Calif.; William G. Redmann, Oak Park, Calif.; Kenneth D. Salter, Glendale, Calif.

[73] Assignee: Disney Enterprises, Inc., Del.

[21] Appl. No.: 08/971,308

[22] Filed: Nov. 17, 1997

[51] Int. Cl.⁶ .................................................. A63G 31/00
[52] U.S. Cl. .......................... 434/55; 434/29; 434/307 R; 434/365; 472/43; 472/59; 345/302; 345/121; 463/31
[58] Field of Search .................................. 434/29, 30, 34, 434/35, 37, 38, 40, 43, 45, 55, 58, 59, 62, 69, 118, 307 R, 308, 365, 372; 472/2, 17, 43, 47, 59, 60, 64, 132, 135; 482/1–9, 900–903; 463/2, 31, 34, 40, 46; 104/53, 85, 154; 348/15, 121, 124, 578; 345/302, 473, 121, 326, 328, 145, 161, 163, 167, 173, 425, 949, 952, 971, 978

[56] References Cited

U.S. PATENT DOCUMENTS

| | | |
|---|---|---|
| 1,393,456 | 10/1921 | Ruggles ................................. 434/55 X |
| 3,749,399 | 7/1973 | Fedor et al. ......................... 472/135 X |
| 4,710,128 | 12/1987 | Wachsmuth et al. . |
| 4,828,099 | 4/1989 | Rusu et al. ............................ 472/47 X |
| 4,976,438 | 12/1990 | Tashio et al. ............................. 463/34 |
| 5,021,982 | 6/1991 | Crosbie et al. . |
| 5,060,932 | 10/1991 | Yamaguchi ................................ 472/47 |
| 5,219,315 | 6/1993 | Fuller et al. ........................ 348/124 X |
| 5,353,242 | 10/1994 | Crosbie et al. . |
| 5,388,991 | 2/1995 | Morris . |
| 5,403,238 | 4/1995 | Baxter et al. .......................... 472/59 X |
| 5,489,212 | 2/1996 | Masao et al. .............................. 434/55 |
| 5,490,784 | 2/1996 | Carmein .......................... 434/307 R X |
| 5,495,576 | 2/1996 | Ritchey ................................ 345/302 X |
| 5,496,220 | 3/1996 | Engstrand ............................. 434/55 X |
| 5,507,647 | 4/1996 | Morris . |
| 5,618,178 | 4/1997 | Copperman et al. ..................... 434/62 |
| 5,685,718 | 11/1997 | McClintic . |
| 5,711,670 | 1/1998 | Barr ........................................ 434/55 |
| 5,827,065 | 10/1998 | McVlintic ................................ 434/29 |
| 5,846,134 | 12/1998 | Latypov ................................ 434/55 X |

FOREIGN PATENT DOCUMENTS

WO 94/19783  9/1994  WIPO .

OTHER PUBLICATIONS

The Walt Disney Company, "Coaster: Thrill Seeker's Guide." © Disney, printed in the U.S.A., 1995.

*Primary Examiner*—Joe H. Cheng
*Attorney, Agent, or Firm*—Medlen & Carroll, LLP

[57] ABSTRACT

A realistic roller coaster simulator is disclosed having one or more passenger seats equipped with a safety harness and mounted for 360 degree rotational movement along at least two axes for simulating the motion of a roller coaster. A controller is provided for controlling and coordinating the motion of the simulator with a simulation controller which generates to the passenger synchronized audio and visual effects which would be experienced by a passenger on a roller coaster of a predetermined design. Linked to the simulator is a design station where a passenger can design his or her own roller coaster. Upon entering the simulator station, the passenger's design can be accessed from memory and selected for simulation on the simulator vehicle. Upon initiation of the simulation, the passenger can experience in real time the visual, motive, audible and other effects (such as wind, heat, cold, water, etc.) of the simulated roller coaster ride which the passenger has designed.

39 Claims, 11 Drawing Sheets ns; more particularly, the present invention relates to ride simulators.

ROLLER COASTER SIMULATOR

FIELD OF THE INVENTION

The present invention relates to the field of amusement rides; more particularly, the present invention relates to ride simulators.

BACKGROUND OF THE INVENTION

Traditional roller coasters achieve thrill by using low speed lift hills, steep drops, 360 degree loops, and high-speed turns. In an effort to attract enthusiasts, theme parks invest significant sums for newer and more thrilling roller coasters which add additional and different effects. However, traditional roller coasters are inefficient. Tall lift hills and the length of track required for high speed runout disrupt the aesthetics of a themed environment and consume valuable real estate.

Furthermore, in the event of a failure or malfunction of equipment, there is an element of danger to passengers traveling at the speeds and from the heights normally encountered in conventional roller coasters. Finally, since the coaster vehicles typically traverse the same track time after time, riders quickly become bored with a particular ride.

The significant cost of roller coasters, in terms of equipment and real estate, has only recently been addressed by simulators which are capable of generating roller coaster effects in an amusement ride which takes up very little space. Such simulators are typically much safer than traditional roller coasters, since the passengers are never more than a few feet above the floor. For example, U.S. Pat. Nos. 5,507,647 and 5,388,991 describe simulator vehicles which can be used to simulate a roller coaster ride. These conventional simulators, however, do not have a sufficient range of motion, or simply do not impart an authentic feeling of riding a roller coaster.

Moreover, conventional simulators are as likely as conventional roller coasters to become boring because the "ride" taken by the rider is repetitive.

There are also conventional computer programs which allow a user to design, on a computer, a traversable track. In 1983, Walt Disney Imagineering (the WED Enterprises) provided to EPCOT in Orlando, Fla., a branching videodisc based interactive attraction called "Design a Coaster." The design was started with a slight drop sequence. Guests, using a touchscreen, would select subsequent individual track segments from a menu. The selections would be linked together to form a complete roller coaster track. Some segment selections would be disallowed, for example a loop or a corkscrew segment was not valid as the first selection because there was not sufficient speed developed. An additional drop was required first. Once selected, a segment was removed from the pool of potential selections (e.g., the guest could only have one corkscrew or one loop in the completed track). Once about five selections had been made, the track was completed automatically and the attraction would play a video of a ride on that track. Every possible sequence beginning with the initial segment was pre-recorded on the videodisc. There was a video sequence for the addition and evaluation (e.g., valid vs. invalid) of each segment remaining to be added to each legal string of segments. With all restrictions, the game would actually support only a very few completed tracks (i.e., two), so there were few possible ride sequences recorded on the disc.

In 1995, Apple Computer, Inc. published a computer program called "Gerbils!" which allows a programmer to build a "rodent-coaster" track, and then use a computer monitor to see what it would be like to traverse the track from the view point of a gerbil moving along the track. Similarly, Walt Disney Computer Software, Inc. has published a computer program called "Coaster," which allows a programmer to design a coaster within certain design parameters, and then use a computer monitor to see what it would be like to ride the coaster. These approaches, while interesting from a design perspective, suffer from a lack of thrills. Seeing a moving image on a computer screen is simply not as exciting an experience as seeing, hearing and feeling the ride in real time.

Accordingly, the need exists for an amusement ride which accurately simulates the visual, audible, and physical effects of a roller coaster, and which provides for much greater variation in the ride which can be taken to increase the popularity and useage of the ride.

SUMMARY OF THE INVENTION

In one embodiment, the present invention provides a realistic roller coaster simulator having one or more passenger seats equipped with a safety harness and mounted for rotational movement along at least two axes for simulating the motion of a roller coaster. A motion controller is provided for controlling and coordinating the motion of the passenger seat with a simulation controller which coordinates the simulation of real time virtual reality type audio and visual effects which would be experienced by a passenger on a roller coaster of a predetermined design. A selection controller communicates with a computer storage means which stores data relating to a plurality of predetermined roller coaster designs. On inputting acceptable user information (such as information for billing purposes and/or individual identification information), the passenger is offered a choice of roller coaster designs for a simulated ride. The passenger selects a specific design, which is transferred to the simulation controller. The passenger is secured in the passenger seat. Upon initiation of the simulation, the passenger experiences in real time the visual, motive, audible, and other effects (e.g., heat, wind, etc.) of a real roller coaster ride.

In yet another embodiment, the present invention includes a design station operably linked to the roller coaster simulator which enables a user to design his or her own roller coaster, and then ride it. In this embodiment, the user employs a design station having an input means and a display means to design a roller coaster. Upon inputting acceptable user information (for example, for billing and/or identification), the design station will first offer the user a choice of terrain from predetermined landscape images. Once the terrain has been chosen, the user is given the choice of a plurality of roller coaster segments which can be linked together around the chosen terrain to form a complete roller coaster. The design station contains data representing the three dimensional size and shape of each landscape image and roller coaster segment, and predetermined rules for determining if any selected roller coaster segment can be placed at a selected position on said landscape image and/or joined to a free end of an already placed roller coaster segment. Once the design is completed, a real time, virtual moving image of a ride on the designed roller coaster can be created and displayed to enable the user to determine if the design is acceptable. If acceptable, the design station can be directed by the user or by programmed instructions to automatically save the completed roller coaster design for later retrieval. If the design is not acceptable, the user can change the design by deleting and replacing unsatisfactory segments and/or by changing the level of thrill. A saved design can be associated with the designer's unique identifying user information, to enable its retrieval for simulation in a roller coaster simulator of the present invention.

Other and further objects, features, advantages and embodiments of the present invention will become apparent to one skilled in the art from reading the Detailed Description of the Invention together with the drawings.

DETAILED DESCRIPTION OF THE INVENTION

Figure 1:
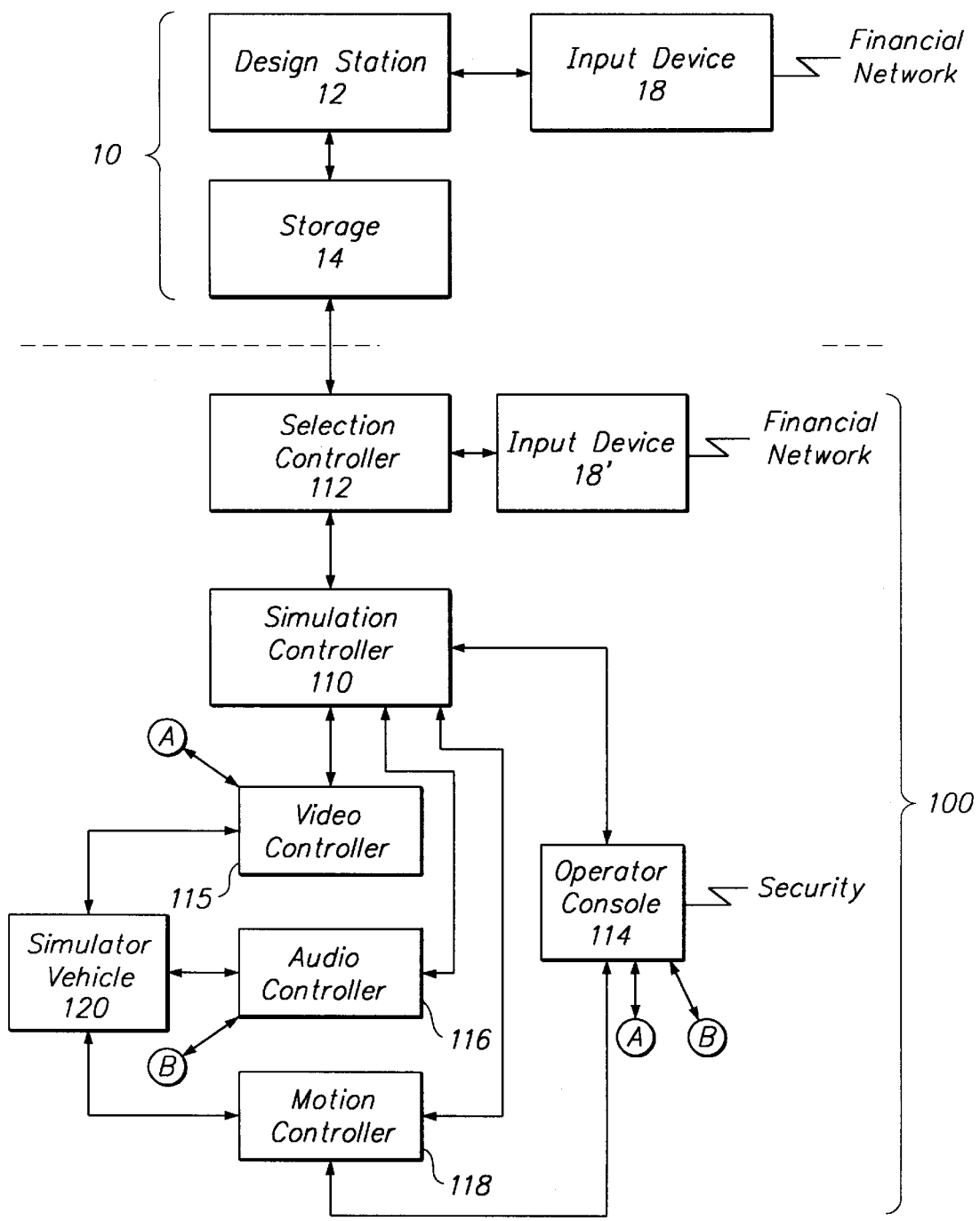
FIG. 1 is a logic diagram illustrating the primary components of a preferred embodiment of the present invention.

As shown in FIG. 1, the present invention includes two primary components: one or more design stations 12 for designing a roller coaster, and a simulator station 100 for simulating a ride on a stored roller coaster design.

Design Station

Figure 3:
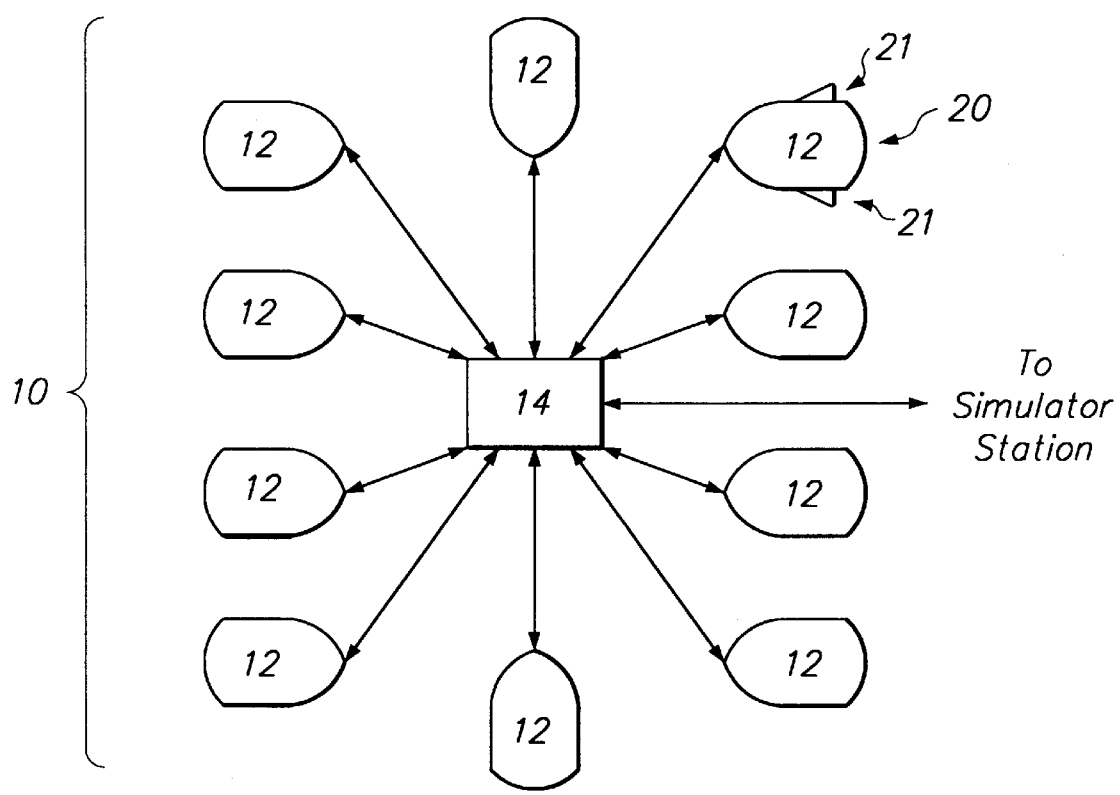
FIG. 3 is a diagram illustrating the preferred design components of the present invention.
Figure 7:
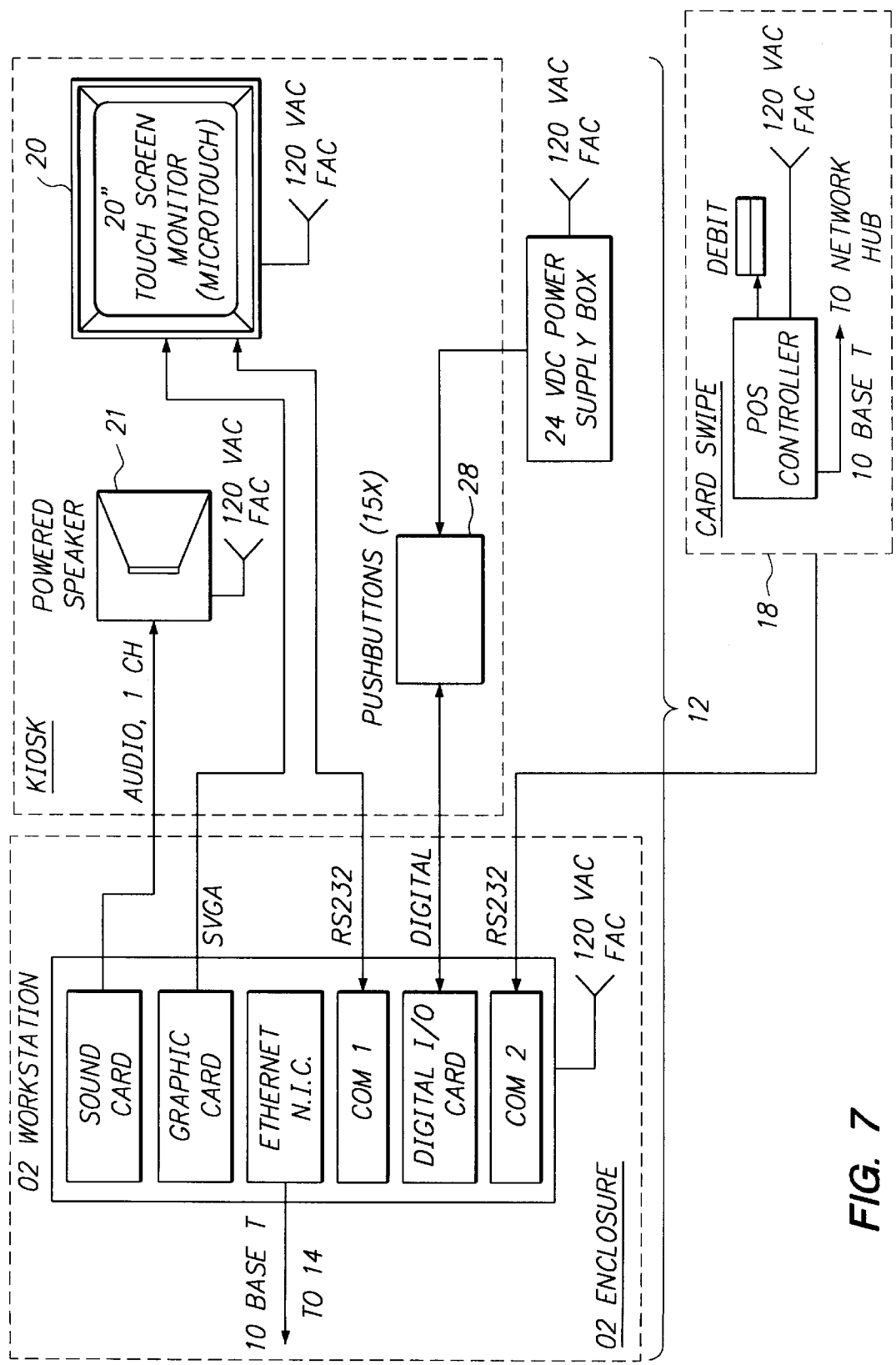
FIG. 7 is a functional block diagram showing a preferred electronic system for a design workstation of the present invention.

As shown in FIGS. 1 and 3, a Design Area 10 can be provided which includes one or more design stations 12, and a storage device 14. The design stations 1 2 are preferably desktop computers provided with touchscreens which are capable of generating 3D graphics, image processing, and real time video processing. The O2™ line of workstations from Silicon Graphics, Inc., which are based on MIPS R5000 CPUs and offer unified memory architecture, are most preferred. Each design station 12 is electronically coupled preferably via a network as shown in FIG. 7 to a computer memory or storage device 14 which can be used to store completed roller coaster designs. A variety of pre-determined landscape images and roller coaster segments which can be selected by a guest or user during construction of a specific roller coaster design, data representing the three dimensional size and shape of each landscape image and roller coaster segment, and predetermined rules for determining if a first roller coaster segment can be placed at a selected position on said landscape image to start a roller coaster design, and if subsequent roller coaster segments selected by a guest can be joined to a free end of a placed roller coaster segment at a selected position on said landscape image as the guest designs a roller coaster can be stored in memory 14, or, alternatively but less desirably, can be stored in memory associated with each design station 12. The memory device 14 can also be used for storing a program for creating a virtual reality type moving image of a virtual ride on a stored roller coaster design, or data relating to a virtual reality type moving image which was previously created. Alternatively, the roller coaster data could be recorded on a data card carried by the guest.

Associated with the design station is one or more user input devices. For example, for commercial use in a theme park setting, an input device, such as a reader 18, can be used to obtain identifying information from a guest. Reader 18 could be a magnetic card reader (used, for example, in conjunction with an encoded magnetic data card) or an optical scanner (used, for example, in conjunction with a card encoded with a bar code). In addition, reader 18 could also include a radio frequency identification receiver, or biometric reader. Reader 18 could be provided at each design station 12, or alternatively could be provided to control entry to the design area 10 and linked directly to a central park controller. For theme park use, for example, a guest could obtain a data card with unique identifying data for entry to a theme park by paying a requisite entry fee. Alternatively, the guest could pay a sum of money and receive a credit on a debit card. The guest could then swipe his card through a card reader to identify herself or himself to the design station, or a central park computer accessed via a network, which could then determine if the guest is authorized to use the design station (i.e., meets entry requirements, has paid the appropriate entry fee etc.). Where a debit card system is used, the central park computer (not shown) or the design station 12 could reduce the amount remaining on the card by the fee charged for this activity. Assuming all requirements are met, the guest is then able to use a single design station 12 to create and, if desired, save, a new roller coaster design, or edit a stored roller coaster design.

As shown in FIG. 7, design station 12 preferably includes a speaker 21 and a touchscreen 20. Alternatively, a conventional computer monitor could be used in lieu of a touchscreen in combination with a keyboard, mouse, light pen, and/or a voice activated input system.

Figure 2:
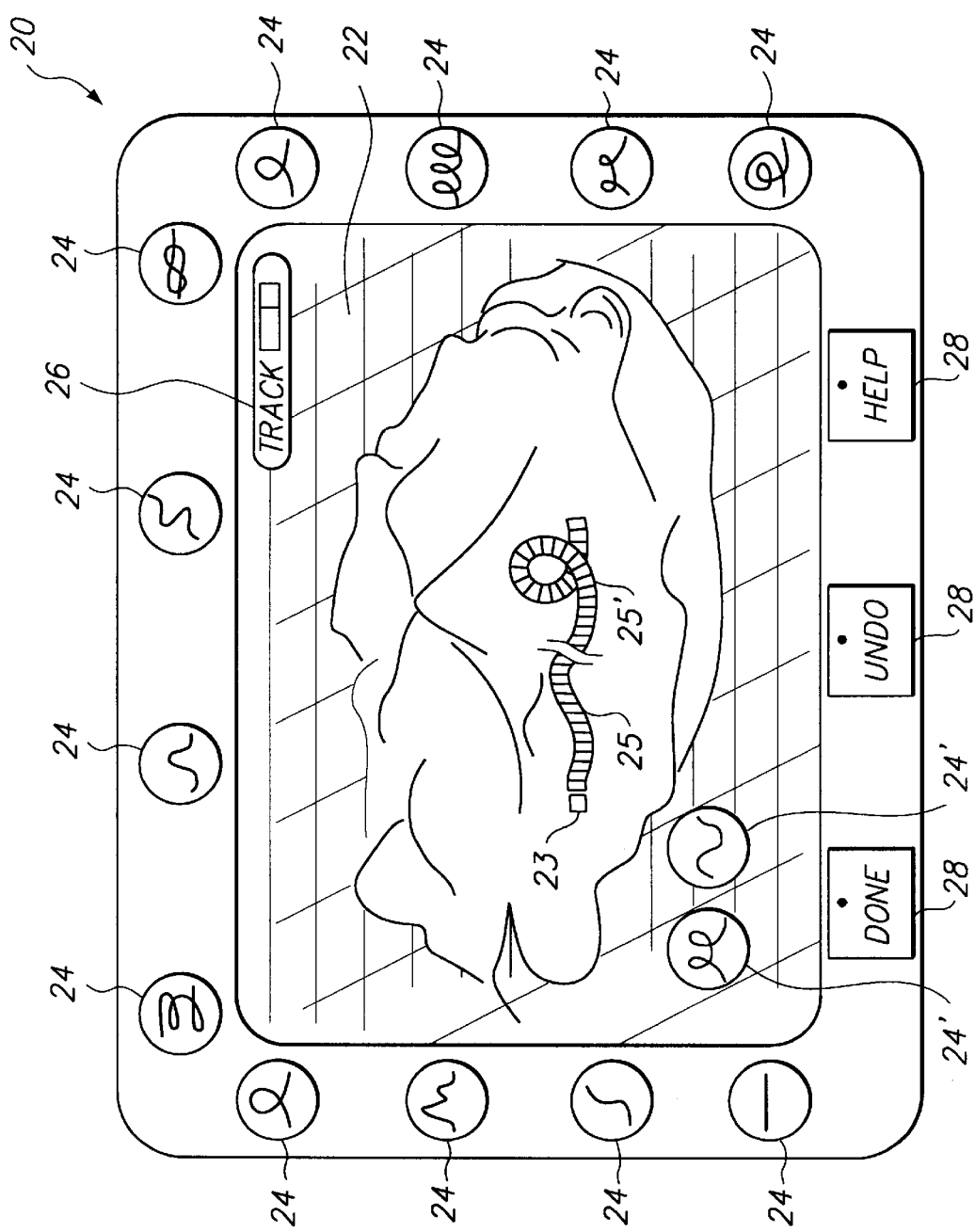
FIG. 2 is a preferred touchscreen layout of the present invention.

A preferred touchscreen layout is shown in FIG. 2. In this layout, the central portion of the screen displays a landscape 22 with terrain features on which the roller coaster is to be built. A variety of different landscapes and terrains can be produced and stored for selection by guests, and themed for use in a theme park setting. Thus, it would be possible to theme the landscapes in very different ways (futuristic city, desert, grand canyon, Washington monuments, tropical island, jungle, moon, planet rings, volcanic mountain, underwater world, ice world, wild west, Never Never Land, etc.) as well as vary them by time (grand canyon during time of the dinosaurs; Paris at the time of Napoleon; Ancient Rome of the Caesars; ice age landscape, etc.)

Once a landscape 22 has been selected, the guest may then choose the level of thrill, for example, by selecting when prompted the desired speed (e.g., "fast", "faster," "fastest", or some other scale from a minimum to a maximum relative speed), or some other increments of speed or performance.

The measure of the thrill experienced has two components: vehicular speed and the severity of track convolutions. Adjustments can be made according to a conventional scaling system, for example: 1 being the slowest/mildest (least thrilling) and 5 being the fastest/most convoluted (most thrilling). Thus, the guest preferably can independently control speed and convolutions by touching the screen to indicate an increase or decrease the level.

The design station is most preferably provided with predetermined rules so that the cumulative thrill desired by the guest does not exceed a predetermined level in order to keep guest sickness, due to motion disorientation, to an acceptable level. Thus, for example, factors such as the weight of the guest can be taken into account in controlling the forces imparted by a simulator on the guest. (For example, weight could be determined in advance, by weighing a guest upon entry and encoding this information on a datacard, or on the fly, by providing a means for weighing a seated guest). Likewise, to prevent injury to guests, the design station can alter segments as necessary. For example, in an event where a guest chooses high speed and a loop, the design station can increase the diameter of the loop segment, since a tight loop at high speed might injure a guest if accurately simulated. In particular, it is preferred to limit the rate at which acceleration on a riding guest is changed. Not only is this a function of the finite performance of a physical motion base, but it is also a matter of guest comfort. As discovered in the earliest days of railroads, the sudden onset of a lateral acceleration (e.g., a straight track which transitions to a curve too abruptly) tends to induce discomfort in passengers (if it does not knock them over). For this reason, both within a track segment and at the joint where two track segments meet, it is desirable to limit the rate of change of curvature and discontinuities in the direction of travel along the track (e.g., no angles which would correspond to a point where the radius of curvature is zero). Situations where this recommendation would be violated would include a simulation of riding down stairs, or hitting a wall. In such a case, the limits of the simulator will likely be the moderating factor.

With the level of thrill set, the guest may select a starting point on the landscape 22, or preferably the design station can require the use of a predefined starting point 23. The guest can then choose a track segment by touching one of the track segment buttons 24 or icons 24' displayed on the screen. This choice will be analyzed by the workstation using predetermined rules accessible by the design station 12 to determine if the selected track segment violates any of the rules (e.g., tracks cannot penetrate the ground surface, tracks don't penetrate each other, track can be looping or open, overall progress is made through the landscape ). As data representative of the size and shape of both the terrain and the track segments are accessible by the design station 12, these rules can be easily and quickly applied.

Assuming the rules are not violated, the guest is informed of the acceptability of his choice when the track segment 25 appears in the desired start location. A track remaining indicator 26 shows the amount of track remaining. The guest then selects another track segment to be linked to a free end of the first placed track segment by, again, touching the track segment buttons 24 or icons 24' corresponding to the desired segment. Again, the system compares the choice to the environment (the terrain and previous track segment) to determine if the new track segment violates the rules. If not, the next track segment 25' appears, connected at the desired end of the first track segment 25. If the rules are violated, a message appears informing the guest that a different choice is required. Track segment buttons 24 and icons 24' will vary in severity from low (e.g., straight away, simple s-curves, and simple hills) to high (e.g., corkscrews, inverted loops). The more thrilling icons can be deactivated (to prevent their selection) where the guest chooses a low thrill level. Alternatively, selecting a high thrill level could produce additional icons 24' on the screen or light additional buttons 24 on the panel for selection by the guest. Alternatively, guests could be permitted a great deal more detailed control over the shape, size and severity of the track (e.g., the height and diameter of a loop). However, the track segment selection technique described above is preferred because it allows a much faster design time.

Specific guest communication icons 28 can also be provided on the touchscreen. The present invention preferably provides a "Help" icon (with which the guest can receive instructions and helpful information on designing a roller coaster using the design station); an "Undo" icon for removing a track segment if the guest changes his or her mind; and a "Done" icon for informing the design station that the design of the roller coaster is complete. Both the track segment icons and/or the guest communication icons could, alternatively, be provided as mechanical switches such as, for example, pushbutton switches mounted on or adjacent the touchscreen.

Alternatively, but less preferably, a guest could create a track using commercially available 3-D equipment. For example, the guest would be provided a pair of 3-D glasses capable of producing a 3-D image in conjunction with the screen. Using a mouse that can read 3-D position in space, the guest could draw the desired track on the 3-D image of the terrain. In an actual test of this concept, the track appears to be extruded out of the mouse like a trail of toothpaste from a tube. In this way, the guest can directly draw loops and corkscrews, curves and humps in whatever way is desired. While visually attractive, this embodiment requires time for the untrained guest to adjust to the effective use of the equipment, and for that reason is not preferred in a commercial environment.

Once a specific roller coaster design is complete, it is preferably saved with the guest's unique identifying data for recall later. Preferably, the guest is prompted to name his or her coaster to differentiate among potentially multiple designs. For speed, the name is preferably comprised of a selection from two groups of words (for example, one group of adjectives and one group of nouns). Thus, for example, the first group of words could include terms like "Screamin', Cosmic, Astro, Cyber, Wily, Jolly, Turbo, Atomic, and Way Cool;" and the second group of words could include terms like "Shredder, Coaster, Express, Trolly, Riot, Rocket, Chariot, O-Matic, and Banshee."

Preferably, the guest is able to preview a ride on the saved roller coaster design, either at the workstation 12 (via the touchscreen) or on a separate previewing monitor or screen (not shown). Preferably, this can occur incrementally with the addition of each track segment. A computer program run on a simulation computer (described in more detail below under the Simulation Station) could also be used to convert the design to a three-dimensional, virtual reality type moving image in real time.

Optionally, on completion, if the design is not all that the guest intended, the guest may modify the design using the undo icon. Once the design is what the guest intended, the guest can then, if desired, proceed to the simulation station 100.

The Simulation Station

As shown in FIG. 1, the simulation station includes at least one simulator ride vehicle 120 which is preferably controlled by a simulation computer/controller 110 through a motion or ride controller 118.

Selection controller 112 can be any computer capable of retrieving the data stored in storage device 14. The guest preferably uses selection controller 112 to choose from among several designs the guest has created. The choices may also include several "canned" designs, which the guest may choose if they appear more attractive, or if the guest has not designed a track. A guest identifies himself using input device 18' (for example, by passing a magnetic data card through a magnetic card reader). Once a design has been selected at the selction controller 112, and simulation controller 110 is in a receptive mode (as opposed to being fully involved in an on-going simulation), the track design data is transferred to the simulation controller 110.

A video controller 115, which is capable of producing real time, 3-D virtual reality type imagery, is preferably provided. In the preferred embodiment, the video controller 115 and simulation controller 110 are provided by the same machine. For this purpose, the SiliconGraphics, Inc. Onyx2 Infinite Reality™ deskside system is preferred. This system includes preferably two (to limit expenses) but may include four 4 MB cache MIPS R10000 processors, 64 MB to 2 GB of memory (preferably 128 MB), a single graphics pipeline with at least one, but preferably two InfiniteReality™ Raster Managers. This system is capable of producing several million textured Z buttered polygons/sec, and can generate over 194 million textured, anti-aliased pixels per second. 16 MB of texture memory is preferably provided, though more is available at increased expense. Because of the cost of this hardware, it is strongly preferred that a video display manager be capable of displaying on at least 8 monitors simultaneously be employed. This allows for the single expensive image generator to drive 4 simulators at high resolution, as well as 4 associated monitors for nonriding guests to view the ongoing action. Video output of at least about 30 Hz is required; however, about 60 Hz S.V.G.A. at 800×600 resolution is preferred. Typical electrical power requirements disclosed in the Onyx-2 technical specifications for this system are: 110 to 220 VAC; 50 to 60 Hz; 2,500 watts; 8,500 BTU/hr heat dissipation; NEMA5-20, 110 VAC @20A; NEMA6-20, 208 VAC @20A.

In creating and replaying the design, the simulation computer receives the information in the storage device 14 from selection controller 112. System RAM of controllers 110 and 115 are preferably optimized by making use of database and texture paging. At run-time, the application can preload all show components. Then it can "unstuff" portions of the database that are not in use. Unstuffing consists of compressing large data components and then removing the memory-consuming original details while leaving the object data structure skeleton in place. Then, when the object is needed, it can be "stuffed": it need not be re-created, but can simply be fleshed out to its original form by expanding the compressed contents and attaching them to the skeleton. This has the advantage of avoiding processor hungry runtime constructors and memory allocation calls and also lets the "unstuffed" objects remain valid to the system so they can be paged asynchronously with no direct synchronization required to the real-time visuals.

Figure 8:
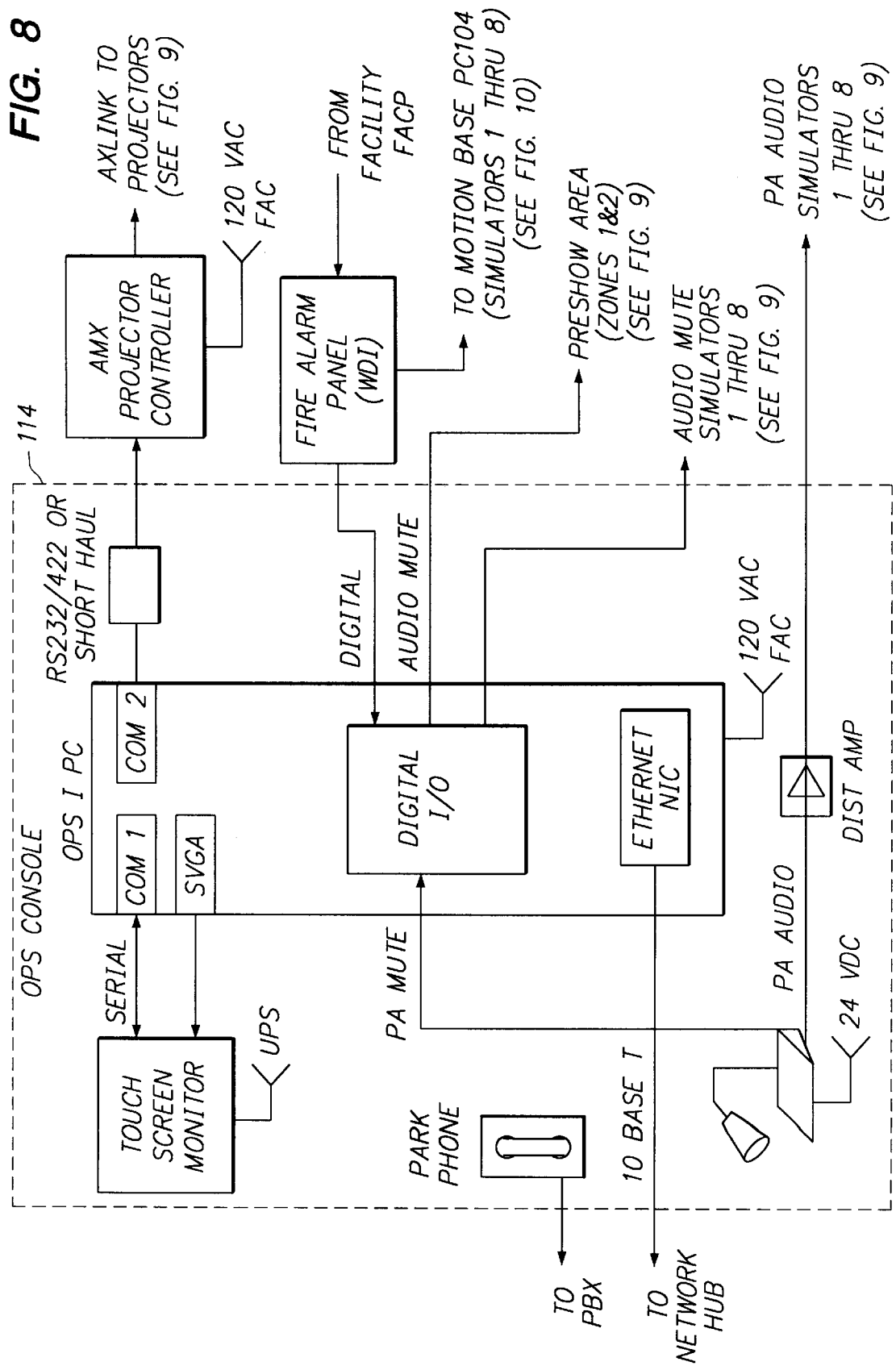
FIG. 8 is a functional block diagram showing a preferred electronic system for an operator's console for controlling a simulator station of the present invention.

An operator's console 114 can be provided for the use of theme park operators for operation and safety purposes and to enable the operator to, for example, start and stop the simulator 120, and authorize access to the simulator 120 for loading and unloading passengers. As shown in FIG. 8, an operator's console can be provided with a touch screen monitor for ease of control, a network link which can be used for a variety of purposes, including retrieving data from multiple controllers, such as, for example, 110, 115, 118, under its management, and a PC which can be used control and monitor systems on-board (e.g., video projectors) and in the queue (or "preshow") area where guests wait before boarding the simulator.

Figure 11:
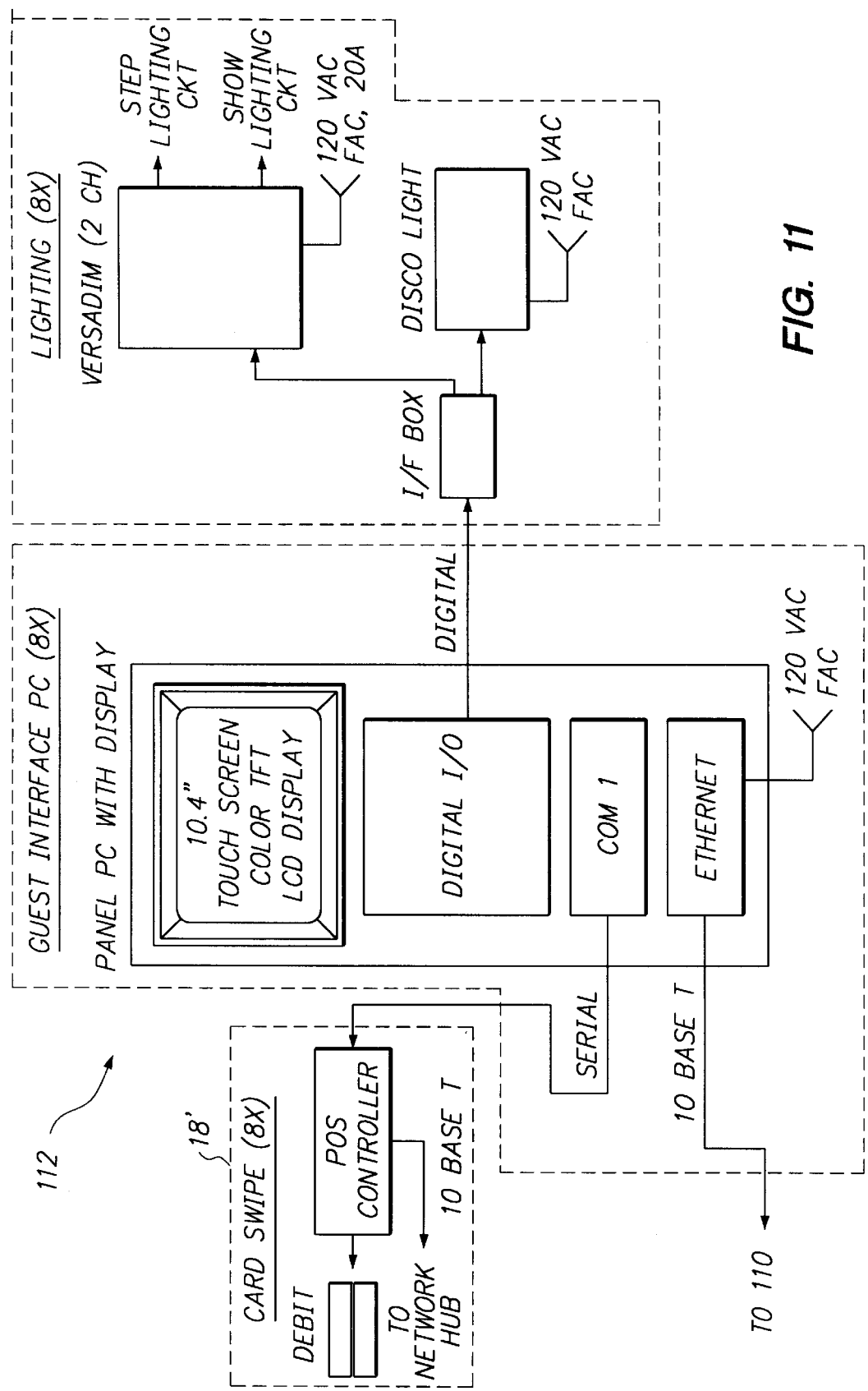

As shown in FIG. 11, selection controller 112, which preferably includes a data reader 18', can be provided for obtaining the guest's unique identification data and status. Most preferably, the guest is then given a choice, and may make a selection from a menu of roller coaster designs which preferably includes any designs created by the guest and saved on storage device 14, and may also include one or more other roller coaster designs available for selection by the guest (for example, the theme park may choose to provide designs of famous roller coasters). As noted above, a touchscreen device is preferred for displaying choices and obtaining the guest's selection; however, other conventional devices such as, for example, a conventional monitor in combination with a keyboard, mouse, light pen, and/or voice activated system may also be used.

Alternatively, a data reader (not shown) could be used to input the guest data, a screen or monitor used to display the roller coaster design choices on operator console 114. The operator could then input the guest's choice via the operator input device 114. If the roller coaster data is recorded on a data card carried by the guest, reader 18' could also provide the roller coaster data to the selection controller 112.

Simulator 120 can be any conventional simulator capable of imparting realistic roller coaster motions to at least one passenger. Examples of such conventional simulators are disclosed in U.S. Pat. Nos. 4,710,128; 5,353,242; 5,021,982; 5,507,647; and 5,388,991, which are incorporated herein by reference for all purposes.

Figure 4A:
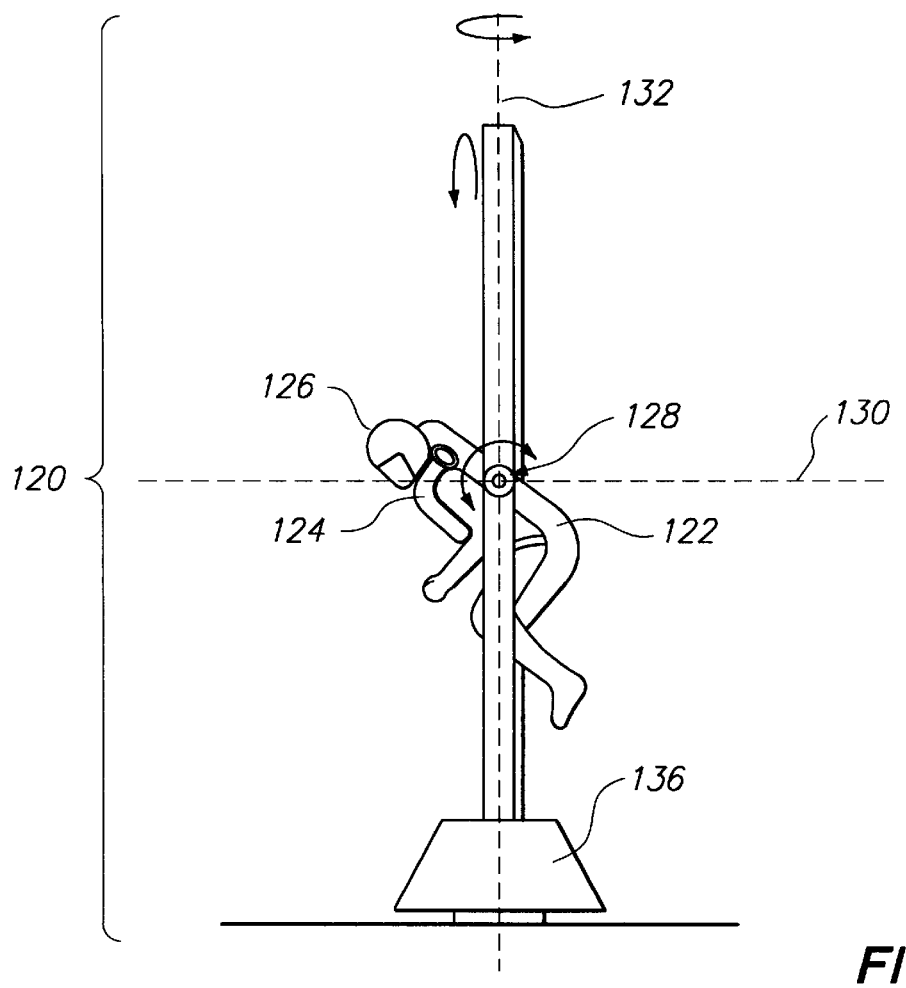
FIG. 4A is a side view of a simulator of the present invention.
Figure 4B:
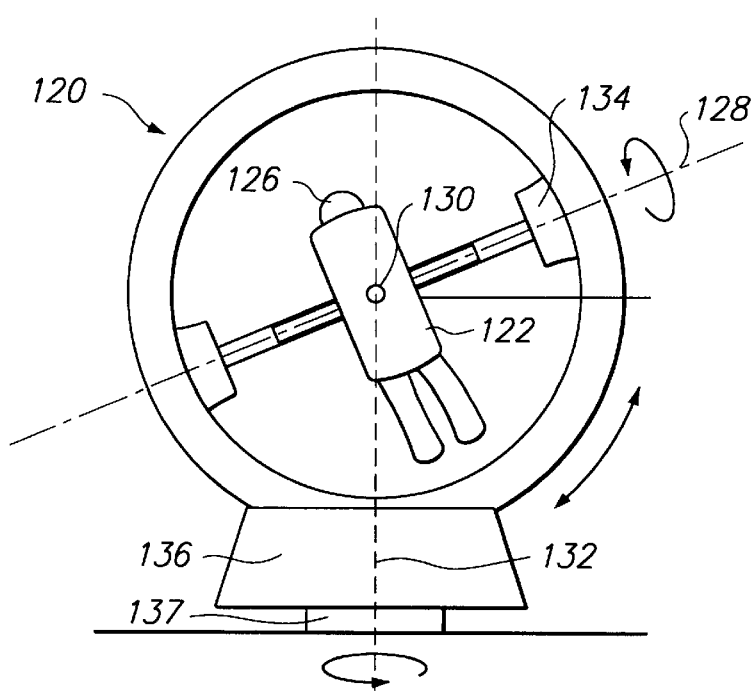
FIG. 4B is a back view of a simulator of the present invention.

A simple form of simulator is shown in FIGS. 4A and 4B. In this embodiment, a passenger sits in a passenger seat 122 which includes a seat harness 124 for restraining the passenger in passenger seat 122. A virtual reality type helmet 126, which projects image and sound to the passenger and is in communication with the video and audio controllers 115 and 116, can be donned by the passenger. Alternatively, the passenger could don virtual reality goggles and earphones.

As shown in FIGS. 4A and 4B, realistic motion can be imparted to the passenger seat 122 by rotation about one or more of three axes: a pitch axis 128, a roll axis 130, and a yaw axis 132. A motor drive 134 for rotating the passenger seat 122 about the pitch axis, a motor drive 136 for rotating the passenger seat about the roll axis, and a motor drive 137 for rotating the passenger seat about the yaw axis can all be provided, and could be linked to the ride controller 118 for control and coordination with the simulation controller 110. In the preferred embodiment, the passenger seat is rotated at least about the pitch and roll axes. For some elements, such as a corkscrew, yaw may be added to provide a more realistic simulation. Most preferably, to provide the most realistic simulation, rotation about the pitch and roll axes of rotation is a full 360 degrees and capable of continuous motion, and rotation about the yaw axis is preferably 90 degrees +/− for full simulation. In positioning passenger seats with relation to the pitch, roll, and yaw axis, the centerline locations for passengers are preferably at or above the heartline, to provide the most realistic feeling simulation.

Ride controller 118 can accept from simulation controller 110 realtime data indicative of the acceleration on the virtual coaster car travelling the track at the point where the current video is being generated and displayed on screen 142. This process causes the simulator to take on an aspect which best simulates the accelerations that would be experienced on an actual coaster. The exact algorithm would depend upon the degrees of freedom and particulars of the motion base. Alternatively, and preferably, motion controller 118 contains prerecorded motion base control sequences constructed by hand by motion experts for each potential track segment and traversal speed combination. At the beginning of the simulation, the set of track segments is relayed along with traversal times to the motion controller 118. The simulation controller 110 begins the simulation with a start signal. On reception of the start signal, the motion controller 118 starts playing the prearranged sequence of motion while, in synchrony, the video and audio controllers (115 & 116) generate their respective performances under control of the simulation controller 110. Alternatively, video and audio might be generated by this same prearrangement scheme (e.g., with a videodisc player being told which segments and in what order to play).

Figure 5:
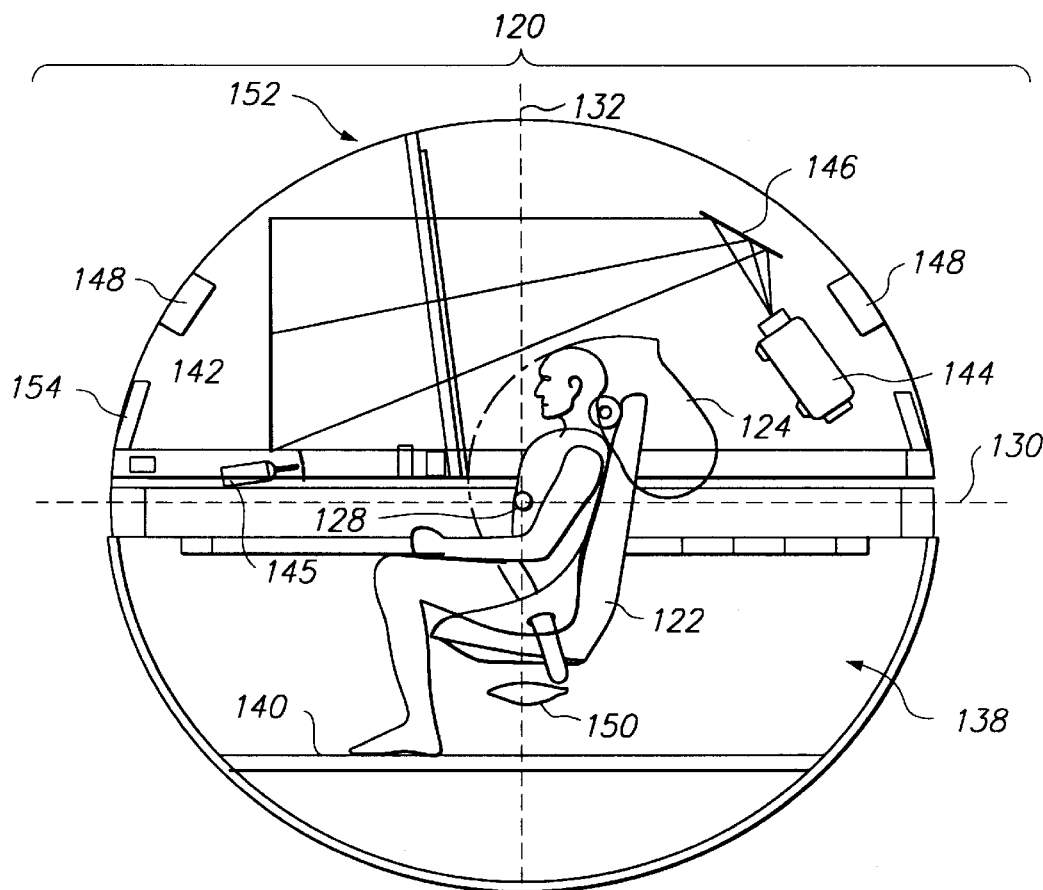
FIG. 5 is a cross-sectional side view of a simulator passenger compartment of the present invention.
Figure 6:
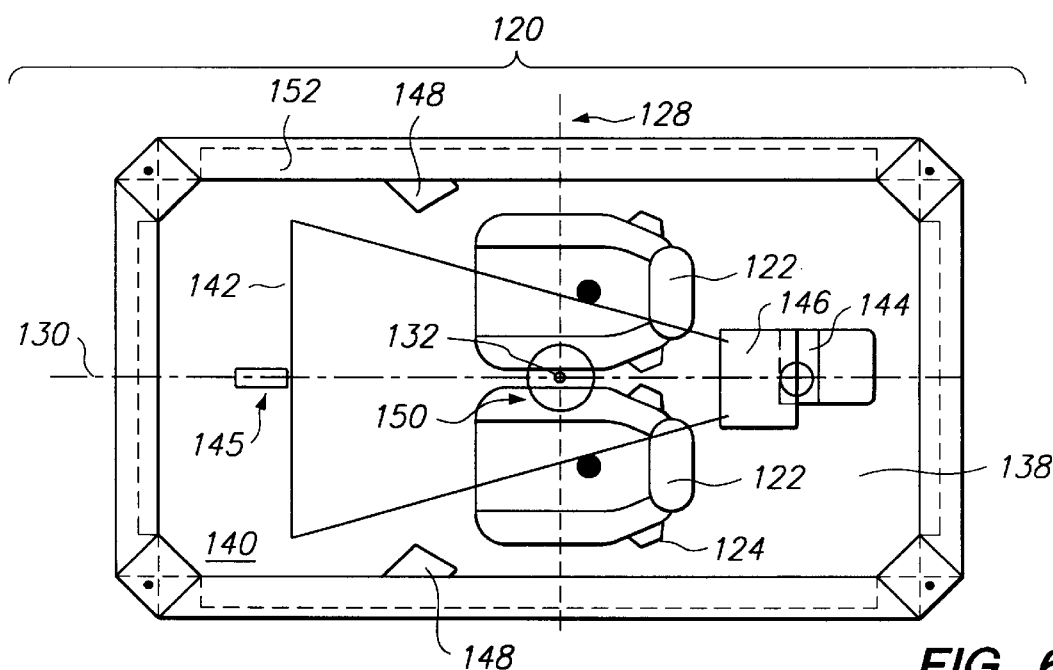
FIG. 6 is a cross-sectional top view of an alternate simulator passenger compartment of the present invention.

More preferably, as shown in FIGS. 5 and 6, the simulator 120 includes a passenger compartment 138 mounted for 360 degree rotation along at least the pitch axis 128 and the roll axis 130. The preferred ordering of the axes in this preferred two axis system is: roll axis innermost and pitch axis outermost. A passenger seat 122 provided with a seat harness 124 and/or other conventional restraining devices can be mounted securely to the floor 140 of passenger compartment 138. Most preferably, two passenger seats, as shown in FIG. 6, are provided.

A viewing screen 142 can be provided for displaying the real time, three dimensional virtual reality type image of the simulated roller coaster ride generated by video controller 115. The viewing screen 142 can be a front or rear projection type television set. Most preferably, the image is front projected preferably by an LCD video projector 144 mounted behind the passenger. The projector 144 may project directly to the viewing screen 142 if desirable; however, if necessary to increase the image size in a restricted passenger compartment by increasing the effective distance between the projector and the screen (referred to as the "throw" distance), the projector may project the image first to a mirror 146 which reflects the image to the screen 142.

Speakers 148 can be mounted in appropriate locations in the passenger compartment for broadcasting realistic sound to accompany the projected image. Most preferably, stereo speakers (not shown) are located in the seat headrest. A low frequency transducer or subwoofer 150, can be mounted in or closely adjacent to the passenger seat 122 to produce realistic vibrations to be sensed by the passenger in association with the projected image.

A door or hatchway 152 can be provided to enable a passenger to enter and leave the simulator vehicle passenger compartment 138. A locking device 154 is preferably provided to securely lock the hatchway in a closed position. Finally, a ventilation system (not shown) is most preferably included for providing fresh air changes in the passenger compartment 138. Such fresh air changes are important for reducing the possibility of motion sickness.

For safety reasons, the simulator vehicle is preferably contained in a safety enclosure (not shown) which is also provided with a locking doors. This safety enclosure prevents operator personnel or passengers waiting in the queueing area, from coming in contact with the moving simulator vehicle. Most preferably, sensors are provided so that entry into this enclosure during operation will cause an emergency stop of the simulator 120.

Figure 9:
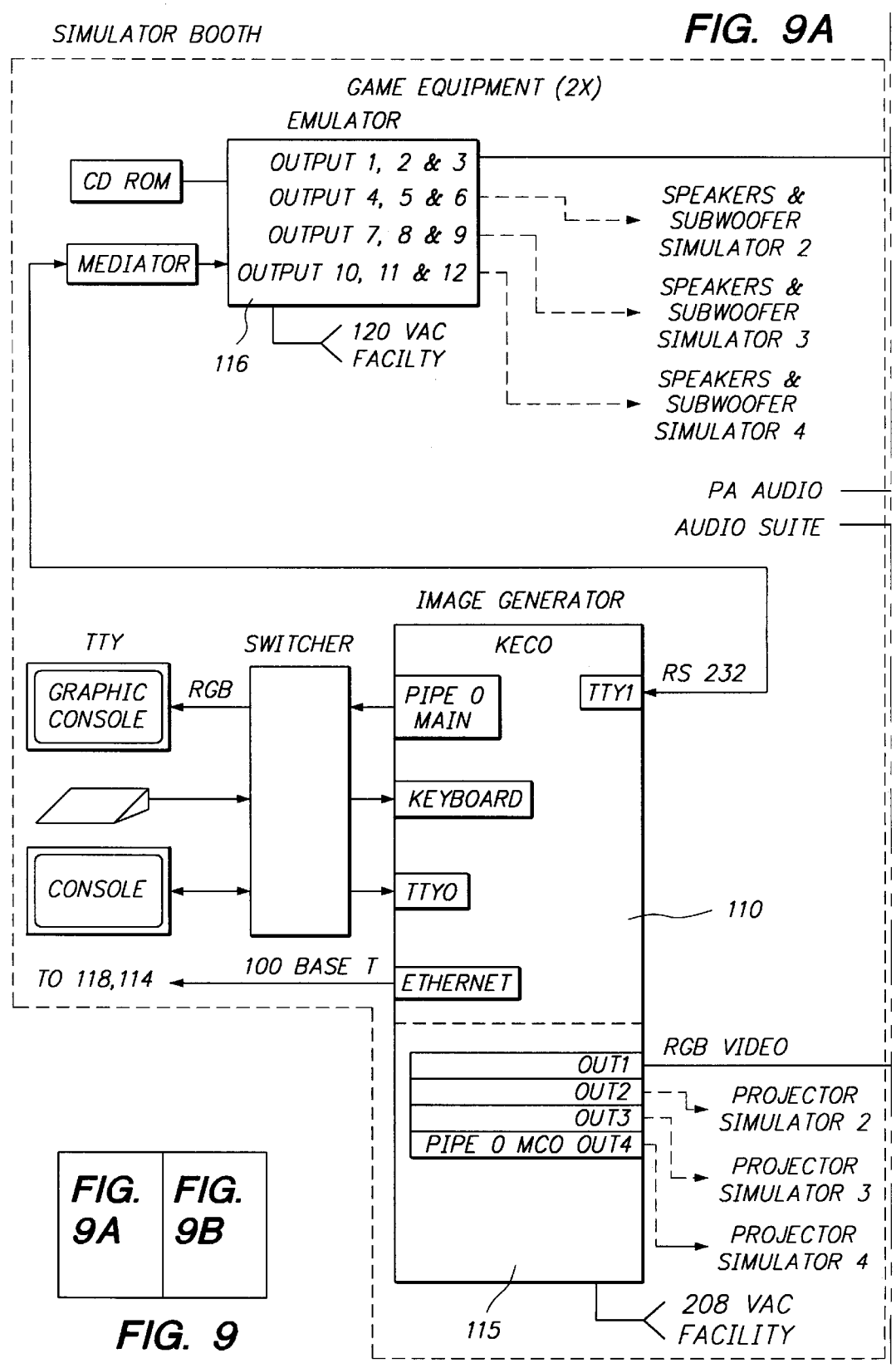
FIG. 9 is a functional block diagram showing a preferred electronic system for creating the real-time virtual reality type audio and visual effects in a simulator of the present invention.
Figure 9B:
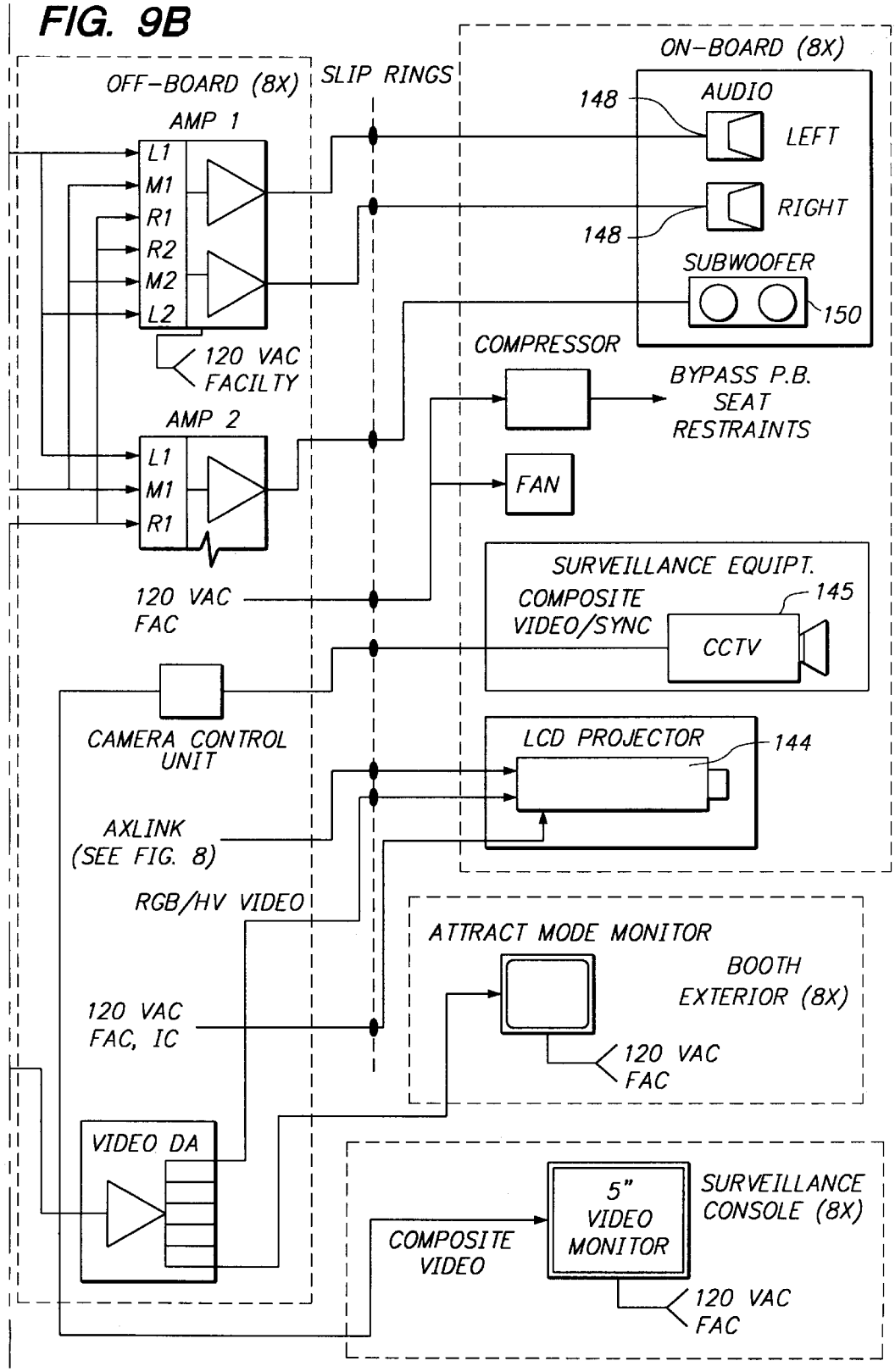
Figure 10:
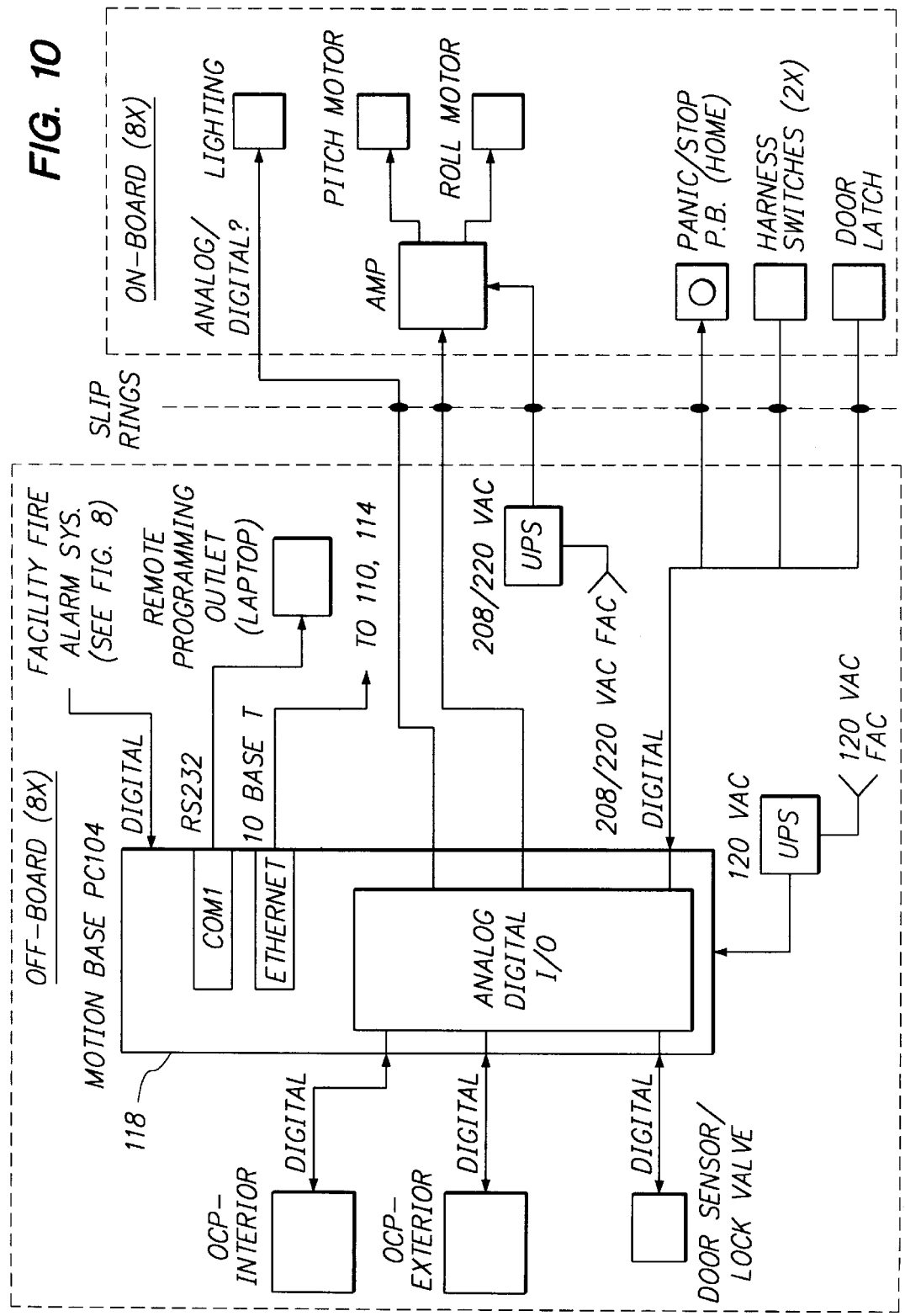
FIG. 10 is a functional block diagram showing a preferred electronic system for a simulator vehicle of the present invention; and, FIG. 11 is a functional block diagram showing a preferred electronic system for a user input device for selecting a roller coaster design to be simulated.

As shown in FIG. 10, motion of the simulator vehicle can be controlled by the motion controller 118—preferably an off-board PC which, for safety purposes, is preferably directly linked to the motors responsible for generating the specific movements, panic STOP buttons, harness switches, and door latches. Alternatively, but at greater risk of software failure, the function of the motion controller 118 can be performed by a processor that is multitasking other functions such as those performed by video controller 115, audio controller 116, and simulator controller 110. Sensors can be provided as desired to verify that the passenger is in the passenger seat, the restraining harnesses are engaged and locked, and each hatchway or door is closed and locked. Surveillance equipment, such as the closed circuit television camera 145 shown in FIGS. 5, 6, and 9, can be mounted inside the passenger compartment and linked to the operator's console or to a separate surveillance console for observation purposes, and to enable the operator to intervene in the event a passenger becomes ill during the simulation. Finally, emergency stop buttons can be provided both inside the simulator passenger compartment (for use by a passenger) or in the operator area for emergency use by the operation personnel.

To use a preferred simulator station of the present invention, the guest enters a queueing area which leads to a loading zone. The queueing area may be provided with special lighting effects, theme art, and/or monitors or other video displays projecting actual or simulated visual and audio effects. When the guest arrives in the loading area, the guest provides his or her identifying information to the system using input device 18' (for example, by swiping a magnetic card through the card reader) and chooses a roller coaster design from the choices obtained from storage device 14 and displayed on a screen by selection controller 112. The operator optionally confirms the guest's choice, opens the safety enclosure door, and opens the hatchway 152 into the simulator vehicle 120 passenger compartment 138. The guest enters the simulator safety enclosure and may be asked to empty his or her pockets into a tray or other suitable receptacle, until the ride is over. More preferably, however, the seat 122 and restraint 124 provide a sufficiently snug embrace that pockets are not disposed to disgorge their contents even when the passenger compartment is inverted.

The guest enters the simulator passenger compartment 138 and sits in a passenger seat 122. The passenger harness 124 is secured about the guest, and the secured condition of the harness is preferably verified by the operator or an operator's assistant. The operator, having preferably performed a final safety inspection for loose articles and the like in the passenger compartment, closes and locks the simulator hatchway 152, and exits the simulator safety enclosure, closing and locking the safety enclosure door. With the guest secured and ready for the ride, the operator begins the program either from the operator console 114, or, preferably, from a conveniently located but secure switch. At this time it is possible, and preferred in order to minimize the time in queue, for the next guest to use the selection controller in preparation for their ride.

As the ride is in progress, special lighting effects may be provided in the simulator passenger compartment to heighten the experience, or outside of the simulator as a visual indicator that the simulator is in operation. Other realistic effects may be added, for example: an air stream may be directed at the guest's face to simulate wind, the air stream may be heated if the simulated environment is hot, the air stream may be chilled if the simulated environment is cold, or water droplets may be sprayed on the guest if the simulated environment is wet. Should the guest become ill or too disoriented to continue the ride, an emergency STOP button is provided which can be used to stop the ride. Once the ride ends, and the simulator has stopped moving completely, the operator opens the door to the safety enclosure, opens the simulator hatchway, and releases the passenger harnesses. The guest exits the simulator, and retrieves his pocket contents in the safety enclosure before exiting the safety enclosure.

One skilled in the art will recognize at once that it would be possible to construct the present invention from a variety of materials and in a variety of different ways. While the preferred embodiments have been described in detail, and shown in the accompanying drawings, it will be evident that various further modification are possible without departing from the scope of the invention as set forth in the appended claims.

What is claimed is:

1. A roller coaster simulator comprising:
   a design station which can be used by a plurality of guests to design a simulated roller coaster, said design station linked to a computer shared by other similar design stations having access to pre-determined landscape images and roller coaster segments which can be selected by a guest, data representing the three dimensional size and shape of each landscape image and roller coaster segment, and predetermined rules for determining if a first roller coaster segment can be placed at a selected position on said landscape image to start a roller coaster design and if subsequent roller coaster segments selected by the guest can be joined to a free end of a placed roller coaster segment at a selected position on said landscape image as the guest designs a roller coaster, said design station including means for associating guest identification data with each roller coaster design created on said design station;
   storage means shared by a plurality of design stations for storing and accessing data related to each roller coaster design completed by said guest at the design station;
   a simulator vehicle for simulating the motion of a roller coaster, and including a passenger compartment, at least one passenger seat mounted in said passenger compartment, a safety harness for securing said guest in said passenger seat, and a means for moving said passenger compartment to simulate the motion of a roller coaster;
   a means for creating a moving picture of a virtual ride of a selected roller coaster design stored in said storage means from the perspective of said guest when seated in said passenger seat, said means for creating a moving picture mounted outside said simulator vehicle;
   a projector mounted in said simulator vehicle for displaying said moving picture to a passenger, said projector connected to said means for creating a moving picture by a cable; and
   a first controller means for accessing said data stored in said storage means and for using said data to control and synchronize the motion of the passenger compartment with the moving picture to create a realistic simulation of said selected roller coaster design.

2. The roller coaster simulator of claim 1 additionally comprising a sound system means for generating or replaying realistic sounds in synchronization with said moving picture and said means for moving said passenger compartment during a simulation.

3. The roller coaster simulator of claim 2 wherein said sound system is controlled by an audio controller which is operably linked to said first controller.

4. The roller coaster simulator of claim 2 additionally including a sound controller for controlling said sound system, said sound controller in communication with said first controller.

5. The roller coaster simulator of claim 1 additionally comprising a means mounted in said passenger compartment for generating vibrations to be sensed by the guest.

6. The roller coaster simulator of claim 5 wherein said means for generating vibrations is a subwoofer associated with said passenger seat.

7. The roller coaster simulator of claim 6 wherein said subwoofer is controlled by an audio controller which is operably linked to said first controller.

8. The roller coaster simulator of claim 1 additionally including guest input means for providing guest information and selections to the design station and first controller.

9. The roller coaster simulator of claim 8 wherein said guest input means is selected from the group consisting of magnetic card readers, optical card readers, radio frequency identification receivers, biometric readers, touchscreens, mouses, keyboards, light pens, and voice activated input devices.

10. The roller coaster simulator of claim 1 wherein said passenger compartment includes a lockable hatchway.

11. The roller coaster of claim 10 additionally including a safety interlock means to prevent initiation of a simulation unless said hatchway is closed and locked, and said guest is seated in said seat with said safety harness engaged.

12. The roller coaster simulator of claim 1 wherein said passenger compartment is pivotally mounted to rotate about 360 degrees about at least two axes.

13. The roller coaster simulator of claim 12 wherein said two axes are a roll axis and a pitch axis.

14. The roller coaster simulator of claim 1 wherein said design station includes a design display means operably linked to the computer for displaying a selected landscape image, roller coaster segments selected by a guest during the design process, and communications from said design station to the guest.

15. The roller coaster simulator of claim 14 wherein said display means is selected from the group consisting of touchscreens, monitors, and printers.

16. The roller coaster simulator of claim 1 wherein said means for creating and displaying a moving picture creates a virtual reality type real time image.

17. The roller coaster simulator of claim 1 wherein said means for moving said passenger compartment includes at least one motor controlled by said first controller.

18. The roller coaster simulator of claim 1 wherein said means for moving the passenger compartment includes at least one motor controlled by a ride controller in communication with said first controller.

19. The roller coaster simulator of claim 1 wherein said projector is a video projector.

20. The roller coaster of claim 19 additionally including a video controller for controlling said video projector, said video controller in communication with said first controller.

21. A roller coaster simulator comprising:
   a passenger seat with a safety harness, said passenger seat mounted for movement by a means for imparting the motion of a roller coaster to said passenger seat;

a means for creating a real-time, virtual moving image of a roller coaster design retrieved from a storage means and selected for replay by a passenger before said passenger is secured by said safety harness to said passenger seat;

a controller means for controlling and coordinating the means for imparting motion and the means for creating said real-time, virtual moving image of said roller coaster design during replay of a selected roller coaster design without any input from the passenger;

a video display means for displaying said virtual moving image to said passenger, said video display means mounted for synchronous movement with said passenger seat and connected to said means for creating a real-time virtual moving image by a cable.

22. The roller coaster simulator of claim 21 additionally comprising a display device associated with said controller means for displaying predetermined roller coaster designs for selection by said passenger prior to replay of said selected design.

23. The roller coaster simulator of claim 21 additionally comprising a passenger input device for inputting said passenger's selection of a roller coaster design stored in said storage means to the controller means prior to replay of said selected design.

24. The roller coaster simulator of claim 21 wherein at least one of said roller coaster designs retrieved from said storage means was created by said passenger.

25. The roller coaster simulator of claim 24 wherein said passenger created said roller coaster design using a design computer operably linked to a passenger input device, a design display device, and means for storing and accessing pre-determined landscape images and roller coaster segments which can be selected by the passenger for joining to the free end of other roller coaster segments to form a completed roller coaster design, along with data representing the three dimensional size and shape of each landscape image and roller coaster segment and rules for determining if specific selected roller coaster segments selected by a passenger can be joined to a free end of another roller coaster segment at a selected position on said landscape image.

26. The roller coaster simulator of claim 21 wherein said video display means is selected from the group consisting of: helmet mounted virtual reality displays, goggle mounted virtual reality displays, front or rear projection television sets, projectors and screens.

27. The roller coaster simulator of claim 21 additionally including audio means associated with said video display means for replaying or generating realistic sounds associated with roller coaster motion as simulated.

28. The roller coaster simulator of claim 27 additionally including means associated with said passenger seat for imparting a vibration to said passenger seat to simulate vibrations sensed during a roller coaster ride over segments such as those being simulated.

29. The roller coaster simulator of claim 21 wherein said passenger seat is mounted to rotate 360 degrees along at least two axes.

30. The roller coaster simulator of claim 29 wherein said two axes comprise a roll axis and a pitch axis.

31. A roller coaster simulator comprising:

a design station including a computer having access to pre-determined landscape images and roller coaster segments which can be selected by a guest, data representing the three dimensional size and shape of each landscape image and roller coaster segment, and pre-determined rules for determining if a first roller coaster segment can be placed at a selected position on said landscape image to start a roller coaster design and if subsequent roller coaster segments selected by the guest can be joined to a free end of a placed roller coaster segment at a selected position on said landscape image as the guest designs a roller coaster, and a display means operably linked to said computer for displaying a selected landscape image, roller coaster segments, and communications from the design station;

storage means, operably linked to said design station and a plurality of other like design stations, for storing and accessing completed roller coaster designs transmitted from said design station;

a simulator vehicle for simulating the motion of a roller coaster, and including a passenger seat, means for restraining a passenger in said passenger seat, and a means for moving said passenger seat;

a means for creating a real-time, virtual reality type moving picture of a virtual ride of a selected roller coaster design stored in said storage means, said selected roller coaster design chosen in advance for replay to the passenger from a plurality of roller coaster designs stored in said storage means;

a display means mounted inside said simulator vehicle for displaying said moving picture to a passenger, said display means linked to said means for creating a real-time, virtual reality type moving picture of a virtual ride;

a first controller means for controlling and coordinating the motion of the passenger seat to the motion visually depicted by said display means associated with said selected roller coaster design, said first controller means operably linked to said means for creating a real-time, virtual reality type moving picture; and, guest input means for providing passenger identification and selections to the design station and first controller.

32. The roller coaster simulator of claim 31 additionally comprising a sound system means for generating or replaying realistic sounds in synchronization with said means for creating a real-time, virtual reality type moving picture.

33. The roller coaster simulator of claim 31 additionally comprising a means associated with said simulator vehicle for generating vibrations to be sensed by the guest.

34. The roller coaster simulator of claim 33 wherein said means for generating vibrations is a subwoofer associated with said passenger seat.

35. The roller coaster simulator of claim 31 wherein said guest input means is selected from the group consisting of magnetic card readers, optical card readers, radio frequency identification receivers, biometric readers, touchscreens, mouses, keyboards, light pens, and voice activated devices.

36. The roller coaster simulator of claim 31 wherein said passenger seat is pivotally mounted to rotate about 360 degrees about at least two axes.

37. The roller coaster simulator of claim 36 wherein said two axes are a roll axis and a pitch axis.

38. The roller coaster simulator of claim 31 wherein said means for displaying said moving picture is selected from the group consisting of virtual reality helmets, virtual reality goggles, rear or front projection television and projectors and screen.

39. The roller coaster simulator of claim 31 wherein said means for moving said passenger seat includes at least one motor.

* * * * *